United States Patent
Sumizawa et al.

(10) Patent No.: US 7,363,150 B2
(45) Date of Patent: Apr. 22, 2008

(54) ON-VEHICLE INFORMATION TERMINAL ABRIDGED MAP GENERATION APPARATUS AND ABRIDGED MAP GENERATION METHOD

(75) Inventors: Akio Sumizawa, Zama (JP); Hiroshi Minagawa, Zama (JP); Wataru Oikubo, Zama (JP)

(73) Assignee: Xanavi Informatics Corporation, Zama-shi (JP)

( * ) Notice: Subject to any disclaimer, the term of this patent is extended or adjusted under 35 U.S.C. 154(b) by 0 days.

(21) Appl. No.: 10/572,320

(22) PCT Filed: Sep. 15, 2004

(86) PCT No.: PCT/JP2004/013435

§ 371 (c)(1),
(2), (4) Date: Jan. 23, 2007

(87) PCT Pub. No.: WO2005/029443

PCT Pub. Date: Mar. 31, 2005

(65) Prior Publication Data

US 2007/0195104 A1 Aug. 23, 2007

(30) Foreign Application Priority Data

Sep. 18, 2003 (JP) ............................ 2003-326744

(51) Int. Cl.
*G01C 21/32* (2006.01)
(52) U.S. Cl. ...................... 701/208; 701/211; 701/209; 340/995.14; 340/995.15
(58) Field of Classification Search ........ 701/200–213; 340/995.1, 995.14, 995.15, 995.17; 342/357.01, 342/357.17, 357.09
See application file for complete search history.

(56) References Cited

U.S. PATENT DOCUMENTS 7,054,744 B2 *   5/2006   Hirose et al. ............... 701/210
7,177,761 B2 *   2/2007   Kaufman et al. ........... 701/211
7,231,297 B2 *   6/2007   Sumizawa et al. .......... 701/211

FOREIGN PATENT DOCUMENTS

| JP | 6-214504 A | 8/1994 |
| JP | 11-202762 A | 7/1999 |
| JP | 11-271068 A | 10/1999 |

OTHER PUBLICATIONS

Noboru Babaguchi et al., "Keiro Rikai Shien no Tameno Ryakuchizu to Sono An'naibun no Sakusei System", Transactions of the Institute of Electronics, Information and Communication Engineers, The Institute of Electronics, Information and Communication Engineers, Mar. 25, 1997, vol. J80-D-II, No. 3, pp. 791 to 800.
International Search Report dated Nov. 16, 2004 (two (2) page).

* cited by examiner

*Primary Examiner*—Richard M. Camby
(74) *Attorney, Agent, or Firm*—Crowell & Moring LLP

(57) ABSTRACT

An on-vehicle information terminal generates an abridged map by abridging a map based upon map data and displays the abridged map. The on-vehicle information terminal comprises an abridgment factor setting unit that sets an abridgment factor indicating an extent to which the map is to be abridged, a map abridging unit that generates the abridged map with specific contents in correspondence to the abridgment factor set by the abridgment factor setting unit and a display unit that displays the abridged map generated by the map abridging unit.

17 Claims, 11 Drawing Sheets

FIG. 5
(a)
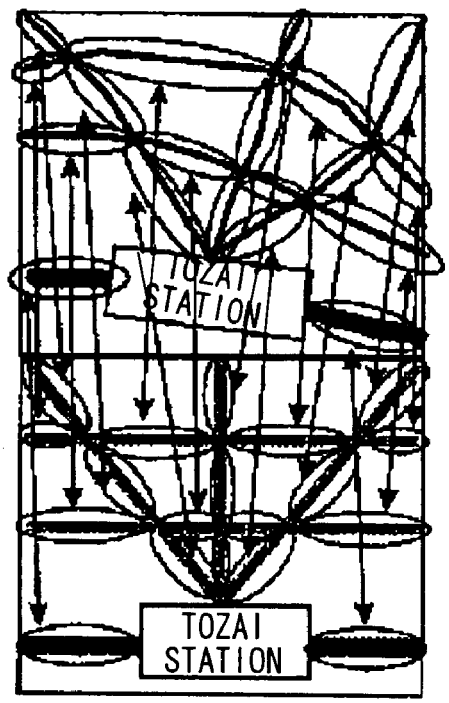
(b)
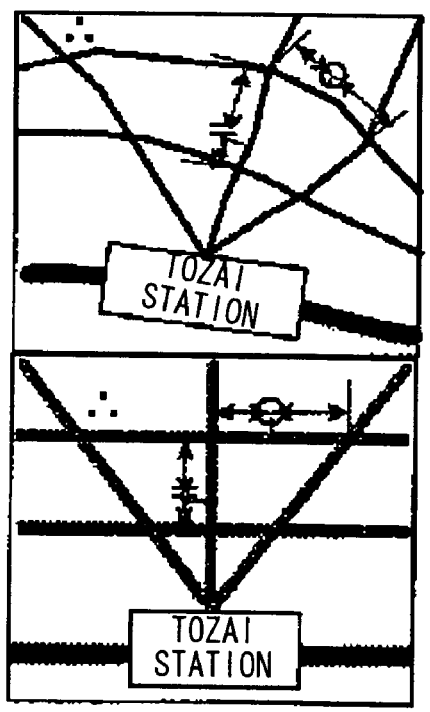

FIG. 6
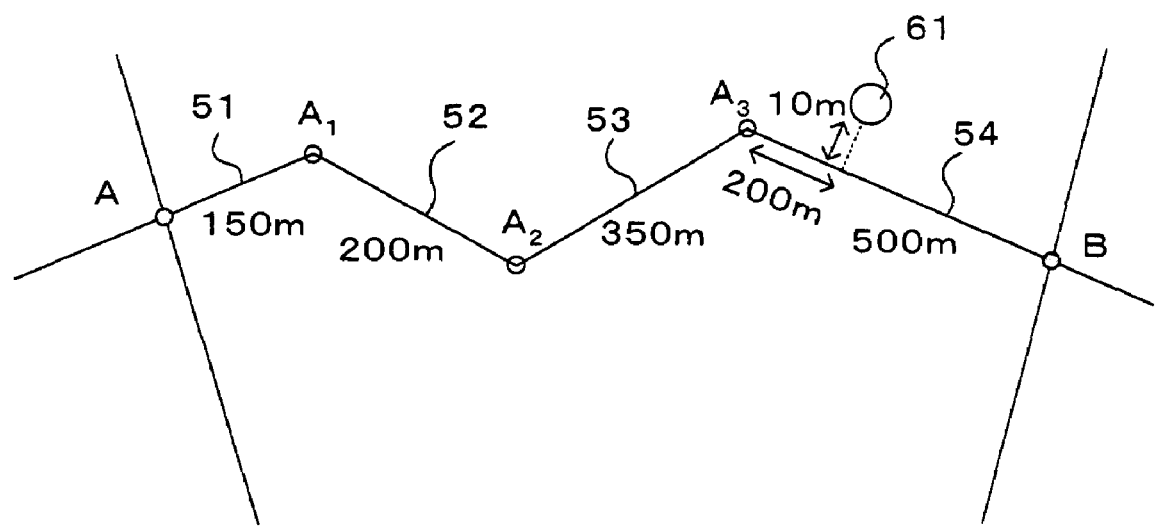
(a)
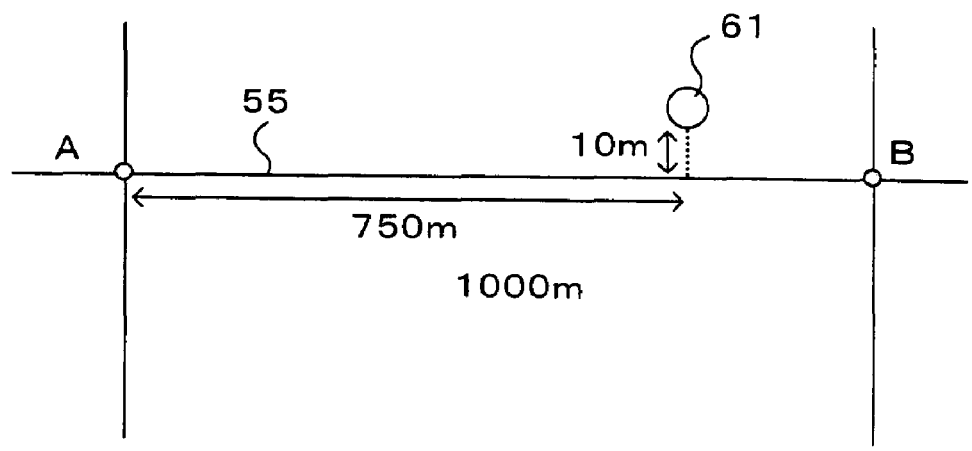
(b)

FIG.8
WIDE-AREA MAP DISPLAY
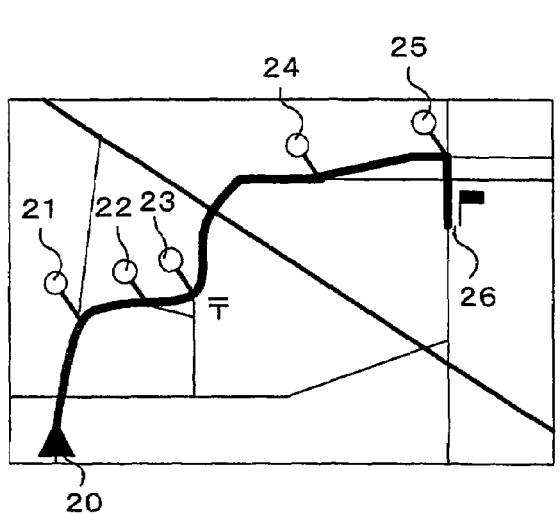
(a) ABRIDGMENT FACTOR 0 (INITIAL MAP)
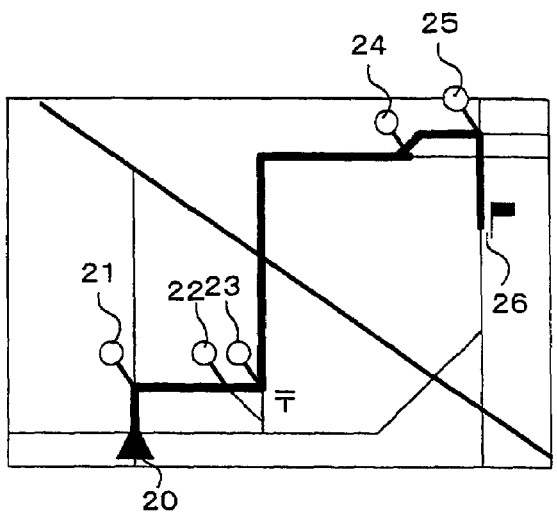
(b) ABRIDGMENT FACTOR 1 (Δθ = 45°)
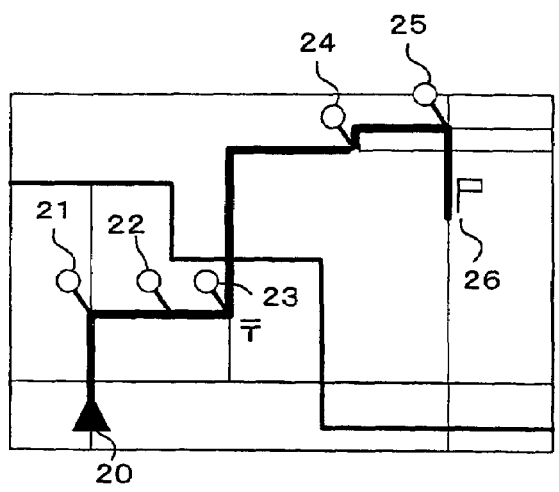
(c) ABRIDGMENT FACTOR 2 (Δθ = 90°)
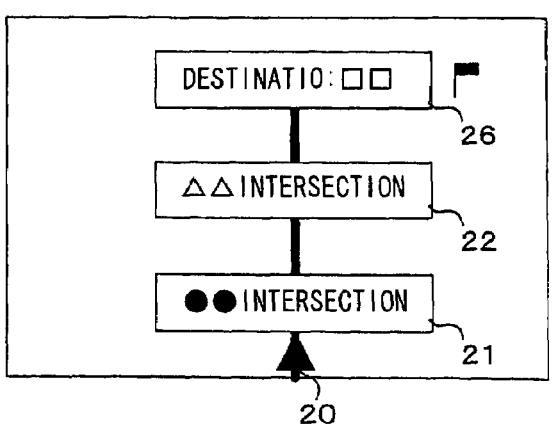
(d) ABRIDGMENT FACTOR 3 (Δθ = 180°)
GUIDANCE-REQUIRING INTERSECTION     DESTINATION FIG.9  DETAILED MAP DISPLAY
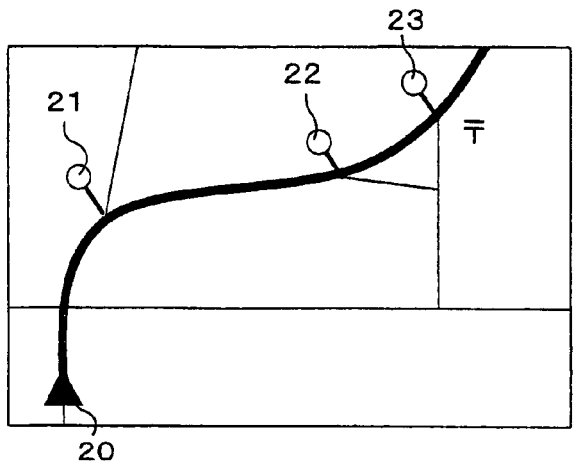
(a) ABRIDGMENT FACTOR 0 (INITIAL MAP)
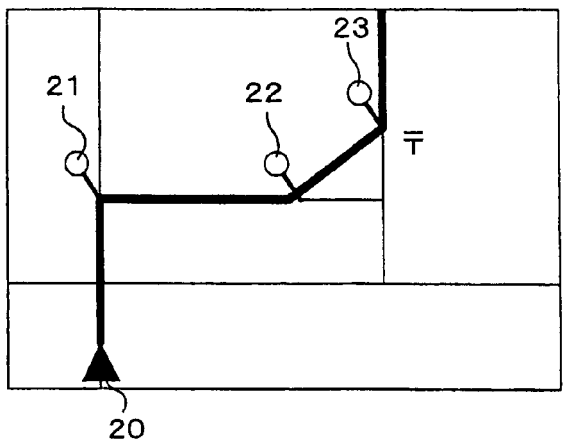
(b) ABRIDGMENT FACTOR 1 ($\Delta \theta = 45°$)
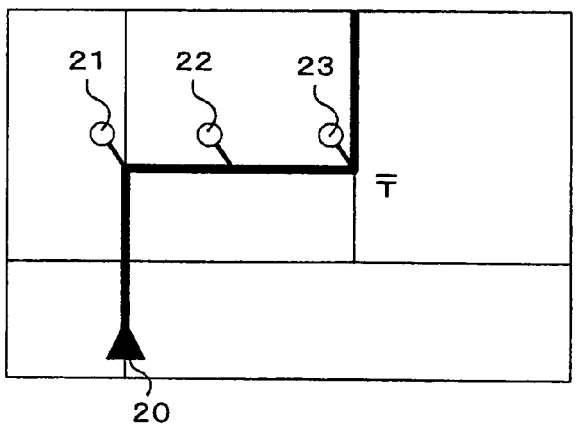
(c) ABRIDGMENT FACTOR 2 ($\Delta \theta = 90°$)
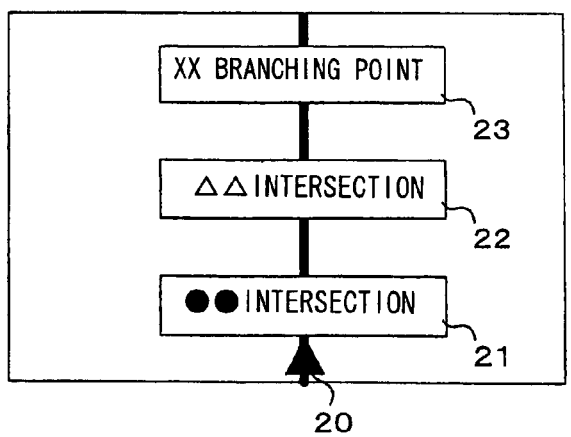
(d) ABRIDGMENT FACTOR 3 ($\Delta \theta = 180°$)
GUIDANCE-REQUIRING INTERSECTION    DESTINATION

ON-VEHICLE INFORMATION TERMINAL ABRIDGED MAP GENERATION APPARATUS AND ABRIDGED MAP GENERATION METHOD

TECHNICAL FIELD

The present invention relates to a method and an apparatus that may be adopted to display a map abridged based upon map data.

BACKGROUND ART

There are methods known in the related art through which an original map is simplified based upon map data used for map expression. For instance, the apparatus disclosed in patent reference literature 1 simplifies the original map by executing processing such as linearization or orthogonalization to linearize or orthogonalize the shapes of roads in the map data and displaying landmark information over a specific range defined with a mask. Through the display of the map having been simplified as described above, an easy-to-read map is provided.

Patent reference literature 1: Japanese Laid Open Patent Publication No. H11-202762

DISCLOSURE OF THE INVENTION

Problems to be Solved by the Invention

Under preset conditions, the contents of processing such as linearization and orthogonalization executed by the apparatus disclosed in patent reference literature 1 remain unchanged. However, depending upon the user preference or the particulars of a given situation, the resulting map may not always be an easy-to-read map and, in such a case, an optimal map display cannot be provided.

Means for Solving the Problems

The present invention provides an on-vehicle information terminal that generates an abridged map by abridging a map based upon map data and displays the abridged map. The on-vehicle information terminal comprises an abridgment factor setting unit that sets an abridgment factor indicating an extent to which the map is to be abridged, a map abridging unit that generates the abridged map with specific contents in correspondence to the abridgment factor set by the abridgment factor setting unit and a display unit that displays the abridged map generated by the map abridging unit.

It is desirable that the map abridging unit in the on-vehicle information terminal generates the abridged map by executing linearization processing and orthogonalization processing for road shapes and that it generates the abridged map with specific contents by adjusting at least either the extent of linearization to be achieved through the linearization processing or the extent of orthogonalization to be achieved through the orthogonalization processing in correspondence to the abridgment factor.

It is also desirable that if the abridgment factor is set at the lowest level in the on-vehicle information terminal, the initial unabridged map is displayed.

In addition, it is desirable that if the abridgment factor is set to the highest level in the on-vehicle information terminal, route information corresponding to a route set on the map alone is displayed.

The abridgment factor setting unit in the on-vehicle information terminal may set the abridgment factor to a higher level when a greater number of intersections at which the vehicle needs to make turns are present in the route set on the map.

The abridgment factor setting unit in the on-vehicle information terminal may set the abridgment factor in correspondence to a road type assigned to the route set on the map.

In another aspect of the present invention, an abridged map generation apparatus that generates an abridged map by abridging a map based upon map data comprises an abridgment factor setting unit that sets an abridgment factor indicating an extent to which the map is to be abridged, a map abridging unit that generates the abridged map with specific contents in correspondence to the abridgment factor set by the abridgment factor setting unit and an abridged map output unit that outputs the abridged map generated by the map abridging unit to an external recipient as a signal.

In yet another aspect of the present invention, an abridged map display method for generating and displaying an abridged map by abridging a map based upon map data comprises steps for setting an abridgment factor indicating an extent to which the map is to be abridged, generating the abridged map with specific contents in correspondence to the abridgment factor having been set and displaying the abridged map having been generated.

EFFECT OF THE INVENTION

According to the present invention that allows an abridged map with specific contents to be generated and displayed in correspondence to the specific abridgment factor having been set, an optimal abridged map that suits the user's preference or the particulars of a given situation can be displayed.

BRIEF DESCRIPTION OF THE DRAWINGS

FIG. 5 illustrates the detail algorithm used in the landmark position correction;

FIG. 6 presents a specific example of the landmark position correction;

FIG. 8 presents examples of abridged wide-area map display, with FIG. 8(a) representing an example in which the abridgment factor is set to 0, FIG. 8(b) representing an example in which the abridgment factor is set to 1, FIG. 8(c) representing an example in which the abridgment factor is set to 2 and FIG. 8(d) representing an example in which the abridgment factor is set to 3;

FIG. 9 presents examples of abridged detailed map display, with FIG. 9(a) representing an example in which the abridgment factor is set to 0, FIG. 9(b) representing an example in which the abridgment factor is set to 1, FIG. 9(c) representing an example in which the abridgment factor is set to 2 and FIG. 9(d) representing an example in which the abridgment factor is set to 3;

BEST MODE FOR CARRYING OUT THE INVENTION

Figure 1:
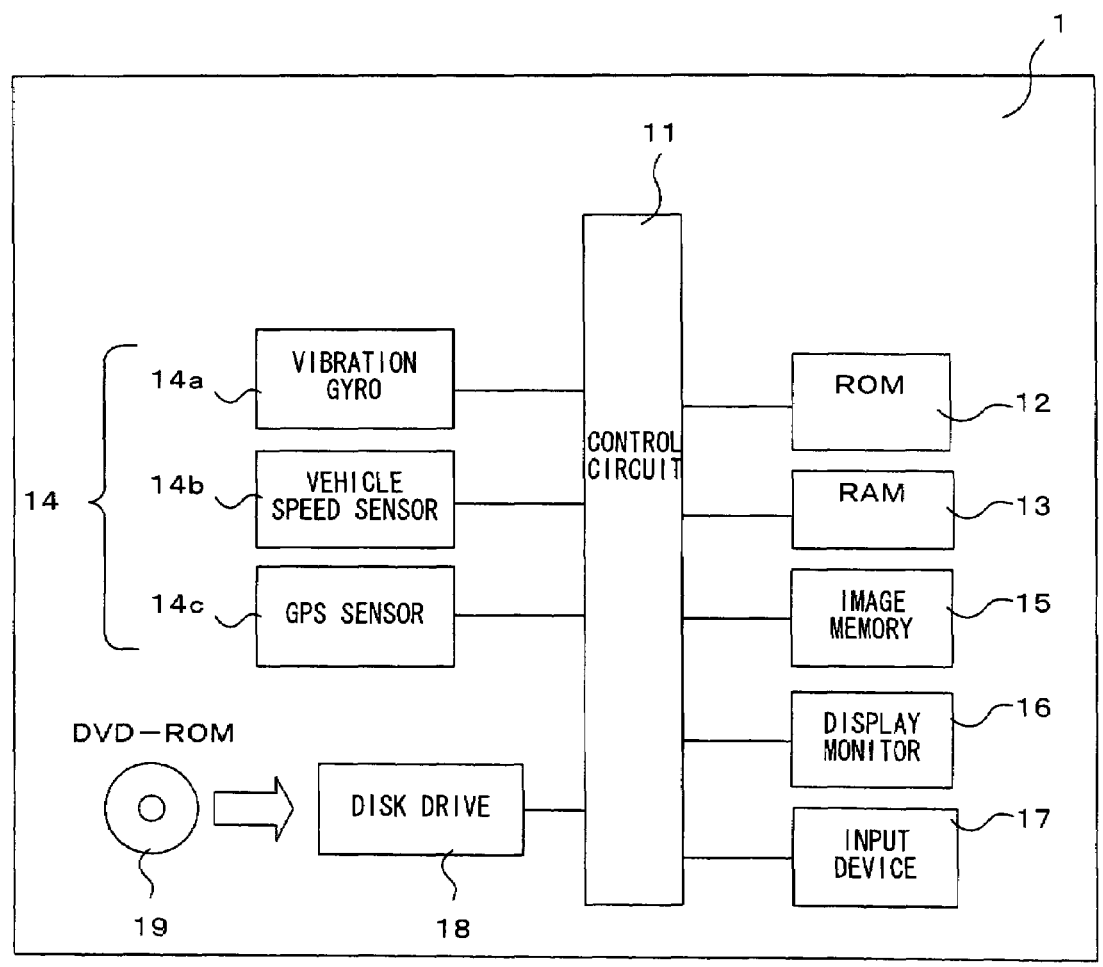
FIG. 1 is a block diagram showing the structure of the navigation system achieved in an embodiment of the present invention.

FIG. 1 shows the structure adopted in the navigation system achieved in an embodiment of the present invention. The navigation system, which is installed in a vehicle, generates and displays an abridged version (hereafter referred to as an abridged map) of a regular map by simplifying road shapes and the like based upon the regular map. The navigation system also adjusts the contents of the abridged map in correspondence to a user selection. The navigation system 1 in FIG. 1 includes a control circuit 11, a ROM 12, a RAM 13, a current position detection device 14, an image memory 15, a display monitor 16, an input device 17 and a disk drive 18. A DVD-ROM 19 having recorded therein map data is loaded into the disk drive 18.

The control circuit 11 constituted with a microprocessor and its peripheral circuits uses the RAM 13 as its work area when executing a control program stored in the ROM 12 to implement various types of processing and control. As the control circuit 11 executes abridged map generation processing to be detailed later, an abridged map is generated based upon the map data recorded in the DVD-ROM 19 and the abridged map thus generated is displayed at the display monitor 16.

The current position detection device 14, which detects the current position of the subject vehicle, may comprise, for instance, a vibration gyro 14a that detects the advancing azimuth of the subject vehicle, a vehicle speed sensor 14b that detects the vehicle speed, a GPS sensor 14c that detects a GPS signal transmitted from a GPS satellite and the like. Based upon the current position of the subject vehicle detected by the current position detection device 14, the navigation system 1 determines the range of the abridged map to be generated, a route search start point and the like, and displays the current position of the subject vehicle on the abridged map.

In the image memory 15, image data to be displayed at the display monitor 16 are stored. The image data include road map drawing data and various types of graphic data used to display the abridged map, which are generated through the abridged map generation processing mentioned earlier. Under the control implemented by the control circuit 11, the abridged map is brought up on display for the user at the screen of the display monitor 16 by using the image data stored in the image memory 15. The input device 17 includes various types of input switches through which the user sets a destination and a waypoint (hereafter simply and collectively referred to as a destination). Such an input device may be an operation panel or a remote-control device. By operating the input device 17 as prompted by screen instructions displayed at the display monitor 16, the user is able to set a destination by specifying its geographical name or its position on the map. The contents of the abridged map to be generated and displayed and the scaling factor for the abridged map can be switched through operations of the input device 17, as well.

The disk drive 18 reads out map data to be used to generate the abridged map from the DVD-ROM 19 loaded therein. It is to be noted that while the map data are read out from the DVD-ROM in this example, the map data may instead be read out from a recording medium other than a DVD-ROM, e.g., a CD-ROM or a hard disk.

Once the user sets the destination, the navigation system 1 determines through an arithmetic operation the route to the destination by designating the current position detected by the current position detection device 14 as a route search start point and using a specific algorithm. The route thus determined is displayed on the abridged map by altering its display mode, e.g., by using a different display color, so as to ensure that it can easily be distinguished from the other roads. As a result, the user is able to identify the route on the abridged map at the screen. In addition, the navigation system 1 guides the subject vehicle along the route by providing visual or audio instructions for the user along the advancing direction.

The method with which the abridged map is generated is now explained. The abridged map is generated by executing processing referred to as abridgment processing on map data contained within a map range having been set. The abridgment processing is a processing method known in the related art. The abridgment processing is now explained in detail.

Figure 2:
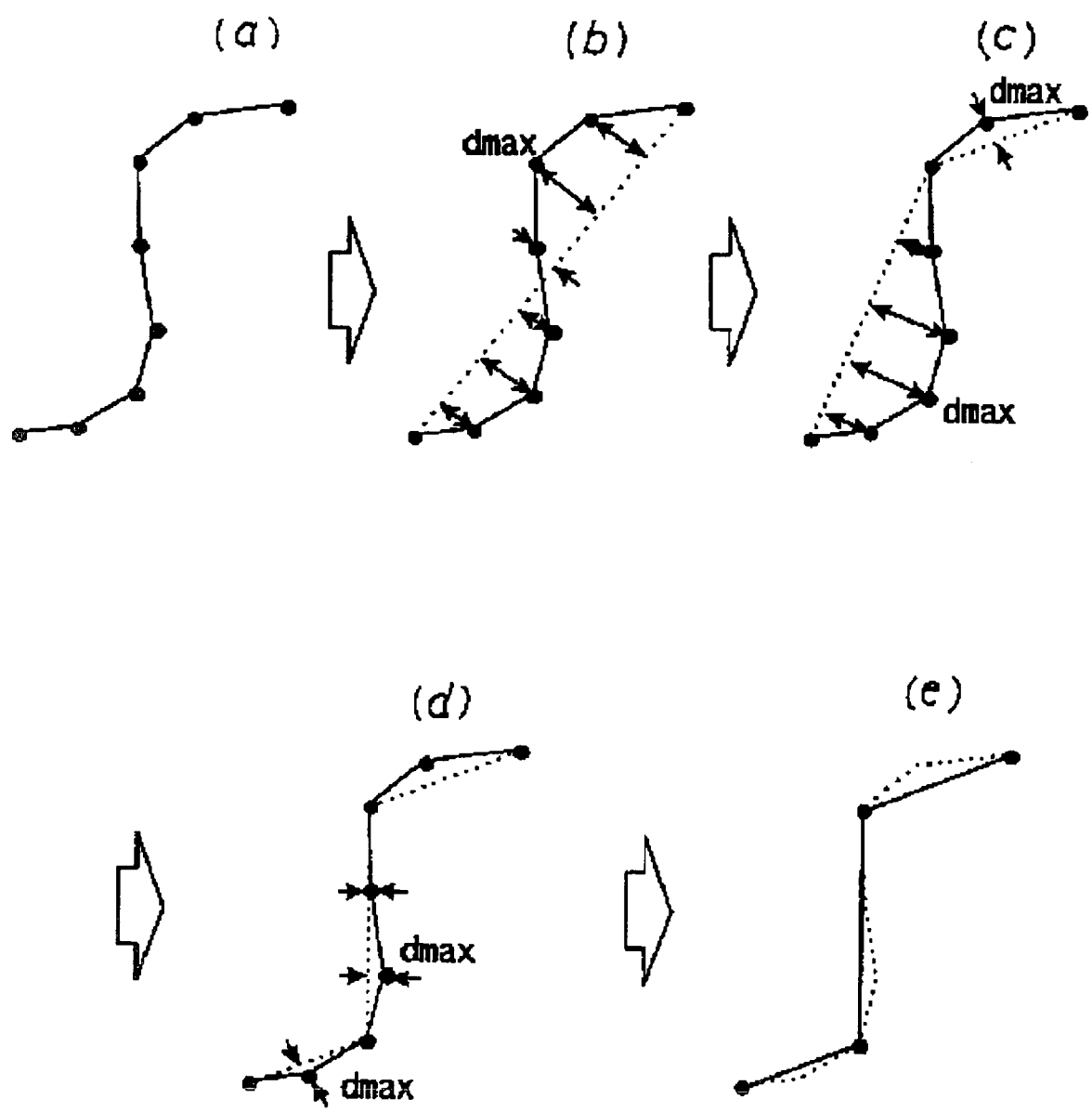
FIG. 2 illustrates the abridgment processing (1) executed to generate an abridged map.
Figure 3:
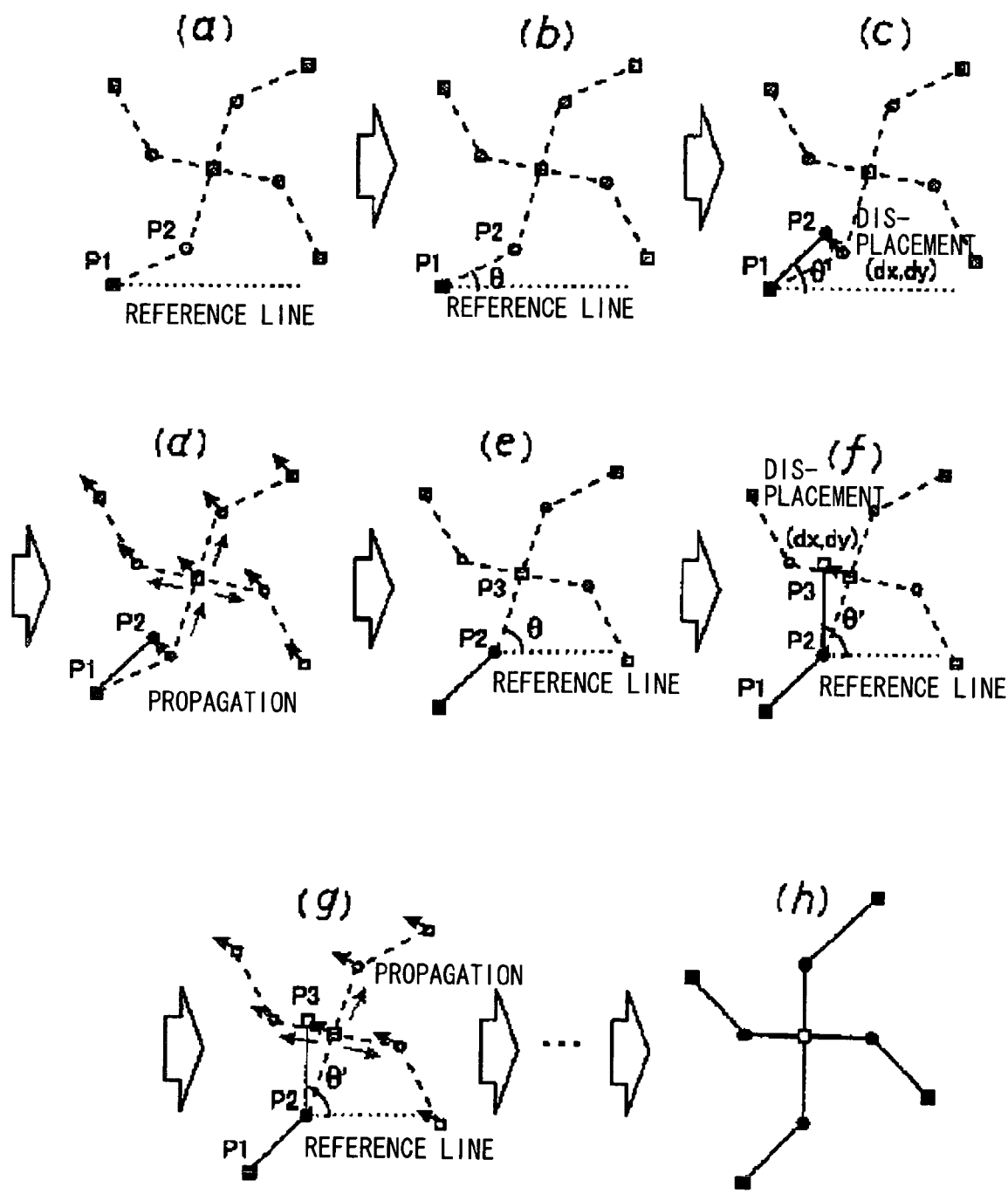
FIG. 3 illustrates the abridgment processing (2) also executed to generate an abridged map.

FIGS. 2 and 3 illustrate in detail the abridgment processing executed to generate the abridged map according to the present invention. In reference to FIG. 2, abridgment processing (1) through which the shape of a road is linearized (the data of the make-up points constituting the road are culled) is explained. Each road shape indicated in the map data is represented by a group of make-up points referred to as nodes, each containing positional information (coordinate information).

Lets us now assume that the shape of the actual road is as indicated in FIG. 2(a). The lengths of the perpendiculars connecting the individual points with the line (the dotted line) that connects the two end points (referred to as a first end point and a second end point) are measured and the largest perpendicular length dmax among them is determined. Then, if dmax thus ascertained is determined to be equal to or greater than a predetermined value setting ϵ (if dmax≧ϵ), the corresponding make-up point is retained. Namely, as shown in FIG. 2(c), the point corresponding to dmax is added as a new end point (to be referred to as a third end point) and lines connecting the first end point with the third end point and the third end point with the second end point are drawn as indicated with the dotted lines.

Processing similar to that described above is repeatedly executed until the largest perpendicular length dmax becomes smaller than ϵ. In the state shown in FIG. 2(d), dmax is always smaller than ϵ. At this time, the shape of the road is indicated with straight lines connecting end points closest to each other. As a result, the road shape shown in FIG. 2(e) is achieved. Through this processing, the shape of the road is linearized.

FIG. 3 shows abridgment processing (2) through which the shapes of roads are orthogonalized. Assuming that the shapes of the actual roads are as shown in FIG. 3(a), a straight line extending parallel to the x-axis (the horizontal direction in the map), which passes through a first point (P1) in the first polygonal line, is determined. This straight line indicated with the dotted line in the figure is used as a reference line. Next, as shown in FIG. 3(b), the angle θ formed by the vector P1P2 connecting the point P1 and the next point P2 relative to the reference line is determined.

Next, as shown in FIG. 3(c), with the vector length fixed, the vector P1P2 is rotated around the start point P1 so that θ'=n·Δθ (n is an integer). As a result, the end point P2 becomes displaced. It is to be noted that the angle Δθ is the unit angle representing the increments with which the vector P1P2 is rotated and may be, for instance, 45°. Through this processing, the angle formed by the vector P1P2 and the reference line is corrected in the increments of the unit angle $\Delta\theta$.

Then, as illustrated in FIG. 3(d), the displacement of points is sequentially propagated beyond the point P2 by an extent matching the displacement (dx, dy) of the point P2. During this process, the displacement is propagated after branching at an intersection. Thus, the positions of the other points are displaced through propagation of the displacement.

Subsequently, processing similar to that described above is repeatedly executed. Namely, as shown in FIG. 3(e), a straight line passing through the point P2 and running parallel to the x-axis is designated as a reference line and the angle $\theta$ formed by the next vector P2P3 and the reference line is determined. Then, as shown in FIG. 3(f), the vector P2P3 is rotated around the start point P2 so that $\theta'=n\cdot\Delta\theta$, and thus, the end point P3 is displaced. Subsequently, as illustrated in FIG. 3(g), the point displacement is propagated beyond the point P3 by an extent matching the displacement (dx, dy) of the point P3. During this process, the displacement is propagated after branching at an intersection.

As the processing described above is executed for all the points in sequence by repeating similar operations, the road shapes shown in FIG. 3(h) are ultimately achieved. Through the processing, the road shapes are orthogonalized. Once the road shapes are linearized and orthogonalized as described above, the abridgment processing ends. The abridged map is generated by executing the abridgment processing over the map range having been set.

On the abridged map generated as described above, landmarks indicating the positions of various types of facilities are displayed as in the original, pre-streamline map. However, as the road shapes are simplified through the abridgment processing, the positions of the roads in the abridged map become different from their positions in the original map. For this reason, the landmarks displayed at the original positions on the abridged map would not indicate the correct positional relationships between the roads and the landmarks. Accordingly, it is necessary to correct the landmark positions after the abridgment processing. The following is an explanation of the method adopted to execute the landmark position correction.

Figure 4:
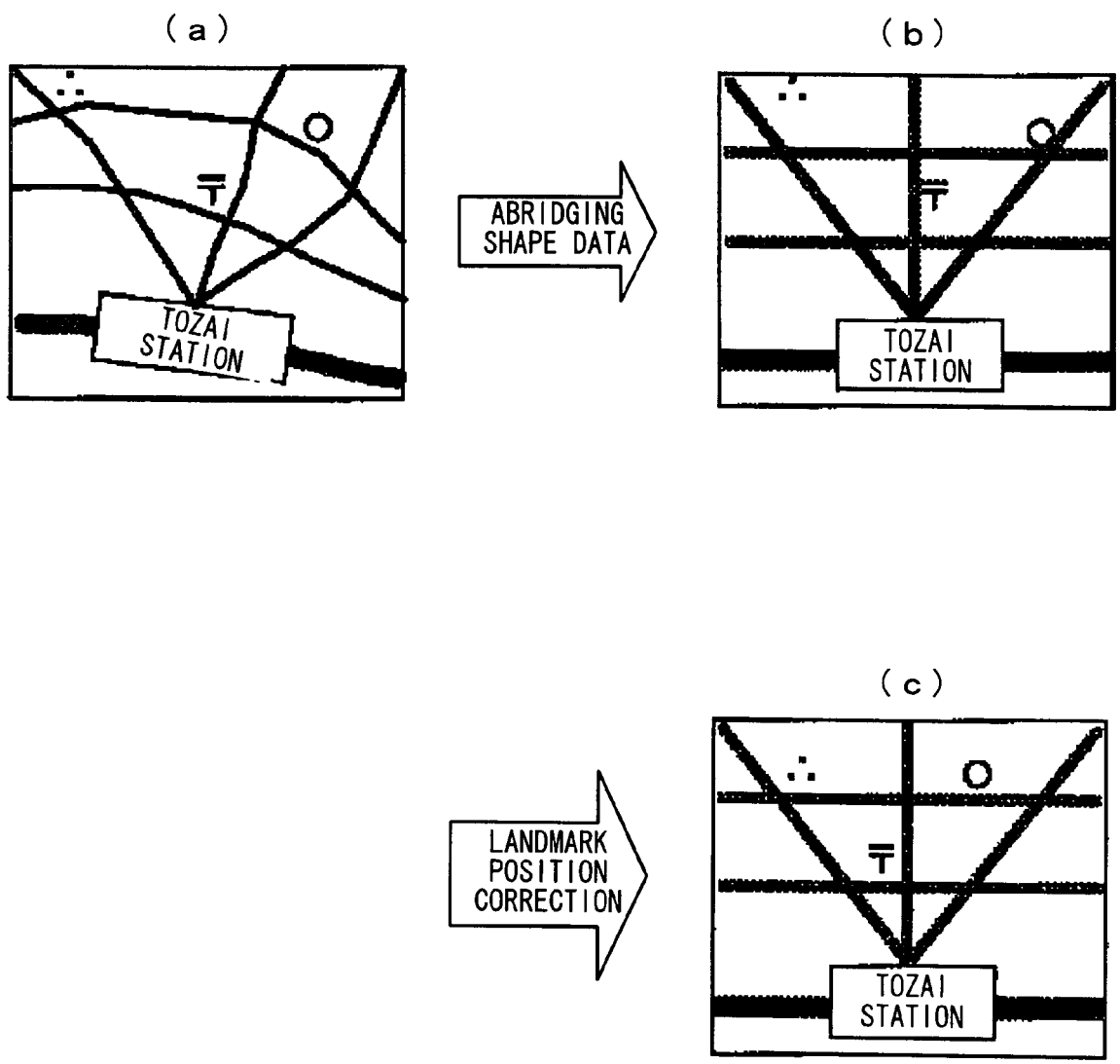
FIG. 4 outlines the landmark position correction.

FIG. 4 outlines the landmark position correction. As shown in FIG. 4(a), subtle positional relationships between the landmark positions and the roads are reflected in the map prior to the abridgment processing. Namely, the landmark positions that may assume any angles in the detailed map indicate subtle positional relationships of the landmark positions to the roads. When the abridgment processing (shape data streamlining) explained earlier is executed on this original map and the original positions of the landmarks are displayed on the streamlined map without any correction, the resulting abridged map may be as shown in FIG. 4(b).

In the abridged map shown in FIG. 4(b), only the road positions are altered from their positions in the original map in FIG. 4(a) and the actual positional relationships between the landmarks and the roads are not correctly reflected. Namely, since the landmark positions still do not reflect the positions indicated in the streamlined shape data, the position of a landmark may be shown, for instance, on the side of the road opposite from the side where it is situated in the original map. More specifically, the position of the post office located around the center of the map is indicated in the abridged map in FIG. 4(b) on the side of the road opposite from the side on which it is indicated in the original map in FIG. 4(a). As the means for addressing this problem, the landmark position correction is executed to approximate the positional relationships between the roads and the landmarks in the abridged map to the positional relationships in the original map, as shown in FIG. 4(c).

Next, in reference to FIG. 5, the detail algorithm used in the landmark position correction is explained. In the landmark position correction, a pair list of pairs of shape vectors, each pair made up of a pre-abridge shape vector and a corresponding post-abridge shape vector, is generated as shown in FIG. 5(a). When the abridgment processing explained earlier is executed to abridge the original map, the number of make-up points constituting each shape vector indicating a road shape changes from the initial number. Accordingly, when compiling the pair list, it is necessary to ensure that the directionalities of the branching points in the shape vectors corresponding to each other and constituting a pair in the pair list match. In other words, it is necessary to ensure that a one-on-one correlation is achieved with regard to the positions of the corresponding branching points in the pre-streamline vector and the post-streamline vector.

Once the pair list is compiled as described above, correction processing is executed to equalize the ratios of the norms of the individual shape vectors in the pair to the corresponding distances to the branching points, as shown in FIG. 5(b). Namely, the ratios of the norm value of the shape vector closest to each landmark and the distances between the landmark and the corresponding branching points along the route containing the shape vector in the initial pre-abridge map are measured. Based upon these measured values, the position of the landmark on the abridged map having undergone the abridgment processing is calculated so as to equalize the ratios of the norm value of the corresponding shape vector in the pair list and the distances from the landmark to the individual branching points to the ratios in the original map. Finally, the landmark is displayed at the position thus calculated.

Since the shapes of the roads and the distances indicated in the abridged map obtained by executing the abridgment processing on the regular map become different, it is necessary to convert the coordinates of the relevant landmarks (stores located along the roads, etc.) in conformance to the changes in the road shapes and the distances, as part of the landmark position correction. Accordingly, positional parameters with regard to the position of each landmark prior to the conversion, i.e., the position of the landmark prior to the conversion expressed as a percentage from one end of the road (link), the side of the road on which the landmark is located and the distance indicating how far off the road the landmark is located, are determined. Then, the post-conversion landmark position in the corresponding road data having undergone the conversion is determined by using these three parameters. This process is now explained in reference to the specific example presented in FIG. 6.

FIG. 6(a) presents an example of a landmark position in an unabridged map. The road connecting a point A and a point B is constituted with a link 51 extending between the point A and a point A1, a link 52 extending between the point A1 and a point A2, a link 53 extending between the point A2 and a point A3 and a link 54 extending between the point A3 and the point B, and a landmark 61 is present along the road. The lengths of the links 51 to 54 are respectively 150 m, 200 m, 350 m and 500 m, and the road connecting the points A and B thus has a length which is the sum, i.e., 1200 m, of the lengths of the individual links constituting the road. The landmark 61 is located at a point 200 m measured from the point A3 toward the point B, i.e., at a point 900 m measured from the point A, on the left side of the road. In addition, the landmark 61 is located at a position distanced from the road by 10 m.

The three parameters explained earlier are determined with regard to the pre-conversion landmark position. The first parameter, i.e., the ratio of the distance to the landmark from one end of the road (from the point A) to the entire distance is 900/1200=0.75 (75%). The second parameter, i.e., the side of the road on which the landmark is located, is determined to be the left side of the road heading toward the point B from the point A. The third parameter, i.e., the distance indicating how far the landmark is off the road, is determined to be 10 m.

FIG. 6(b) presents an example of the landmark position in the abridged map. In this abridged map, the road connecting the point A and the point B is indicated with a single link 55 the length of which is 1000 m. When displaying the landmark 61 on this abridged map, the converted position of the landmark is determined based upon the three parameters having been obtained as described above. Namely, the distance from the point A is calculated to be 1000×0.75=750 m based upon the first parameter. In addition, based upon the second parameter and the third parameter, the position of the landmark is determined to be at the point located on the left side of the road (the link 55) viewed from the point A and distanced from the road by 10 m. The position of the landmark 61 is corrected as the landmark 61 is displayed at the position satisfying these requirements.

Through the processing explained above, the individual landmarks are indicated at corrected positions in the abridged map and the positional relationships between the roads and the landmarks are approximated to those in the unabridged original map. Thus, the landmarks in the original map shown in FIG. 4(a) are displayed at the positions shown in FIG. 4(c) in the abridged map. It is to be noted that this landmark position correction method itself is of the known art.

According to the present invention, the processing contents of the abridged map generation processing described above, i.e., the contents of the abridgment processing, are adjusted in correspondence to the abridgment factor having been set. The term "abridgment factor" in this context refers to a factor in correspondence to which the parameters to be used in the abridgment processing are determined. Namely, the value set for the specific value $\epsilon$ with which the largest perpendicular length dmax is compared, is adjusted in correspondence to the value of the abridgment factor in the linearization processing executed on road shapes, as explained in reference to FIG. 2. During the orthogonalization processing executed on road shapes as explained in FIG. 3, the value of the unit angle $\Delta\theta$ of the rotation of the vector P1 P2 is adjusted in correspondence to the abridgment factor.

For instance, if the abridgment factor is set to 1, $\epsilon=\epsilon_0$ and $\Delta\theta=45°$, if the abridgment factor is set to 2, $\epsilon=2\epsilon_0$ and $\Delta\theta=90°$ and if the abridgment factor is set to 3, $\epsilon=3\epsilon_0$ and $\Delta\theta=180°$. $\epsilon_0$ indicates a constant. In addition, if the abridgment factor is set to the lowest level, i.e., 0, the map is not abridged and the initial unabridged map is displayed. It is to be noted that either $\epsilon$ or $\Delta\theta$ may be a variable and the other may be set as a fixed value.

The user is allowed to set a desired value for the abridgment factor by operating the input device 17. Alternatively, the value of the abridgment factor may be automatically adjusted in correspondence to the particulars of a given situation, e.g., the number of intersections at which the vehicle needs to make a turn (hereafter referred to as guidance-requiring intersections) along the route set on the map. In the latter case, it is desirable to set the abridgment factor to a higher level to simplify the shape of the route containing a large number of guidance-requiring intersections and to set the abridgment factor to a lower level if only a small number of guidance-requiring intersections are present along the route, since a route containing numerous guidance-requiring intersections is bound to have a complex shape under normal circumstances. Alternatively, the abridgment factor may be automatically set in correspondence to the road type assigned to the route. For instance, the abridgment factor may be set to a higher level for an express highway than for a regular road, so as to simplify the shape of the express highway by a greater degree.

The extent of linearization to be achieved through the linearization processing is altered by adjusting the specific value $\epsilon$. When the specific value $\epsilon$ assumes a greater value, the greatest perpendicular length dmax also needs to assume a greater value in order to retain make-up points in each road. Namely, as a greater value is assumed for $\epsilon$, the conditional expression dmax<$\epsilon$ for linearization is satisfied even if dmax assumes a larger value, which results in fewer make-up points retained in correspondence to each road. This means that as the specific value $\epsilon$ increases, the extent of linearization, too, increases.

The extent of orthogonalization to be achieved through the orthogonalization processing is altered by adjusting the value of the unit angle $\Delta\theta$. When the unit angle $\Delta\theta$ assumes a greater value, the vector rotates in greater angular increments and thus, the extent of orthogonalization increases. It is to be noted that if the abridgment factor is set to the highest level, i.e., if $\Delta\theta=180°$, all roads will be indicated as a single straight line and it will become impossible to distinguish intersecting roads. Accordingly, the route information on the route alone is displayed in place of the abridged map in such a situation.

Figure 7:
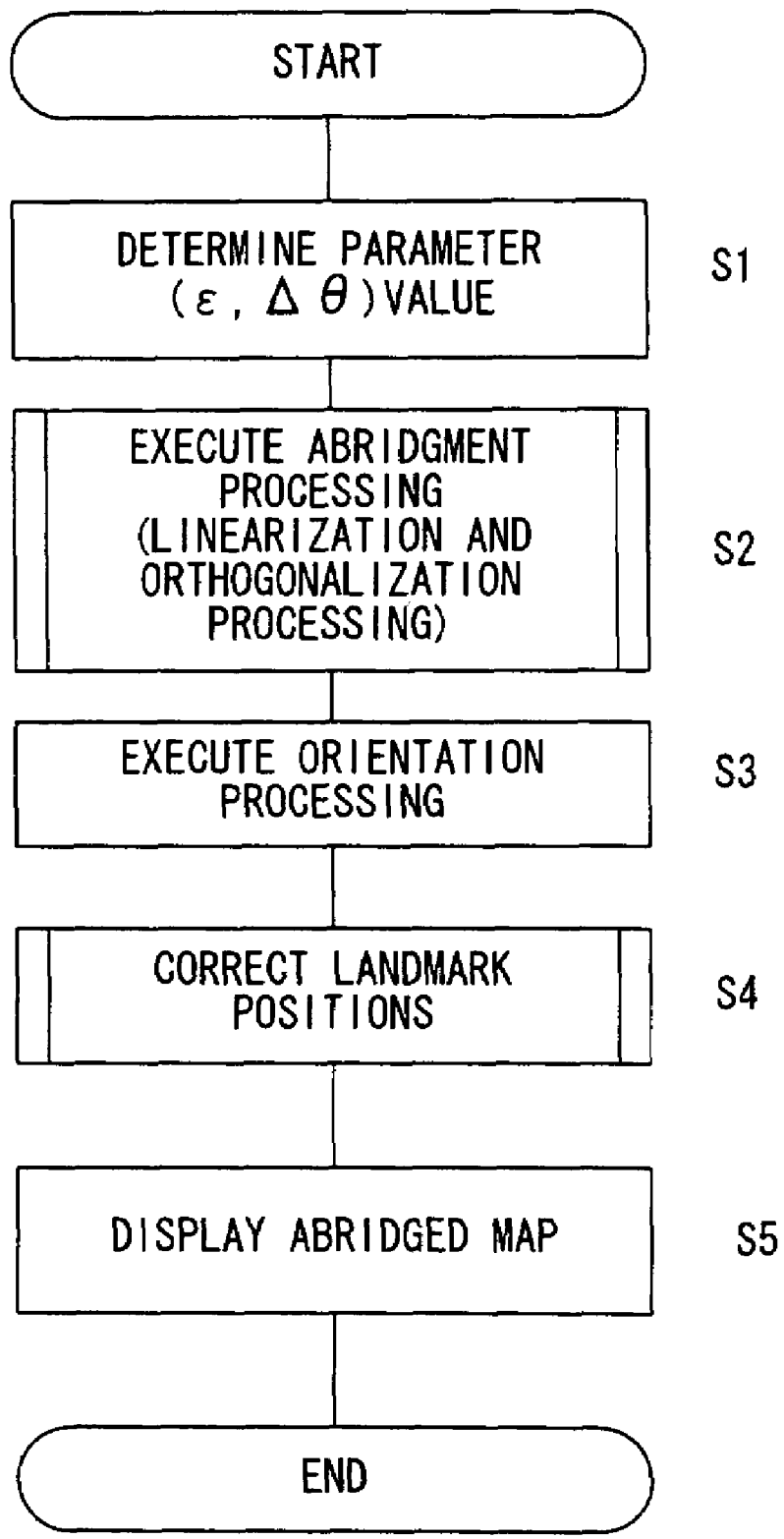
FIG. 7 shows the flow of the processing executed to generate and display an abridged map.

FIG. 7 presents a flowchart of the processing executed to generate and display an abridged map. The processing in this flowchart is executed by the control circuit 11 when an abridged map display condition is satisfied. For instance, this processing is executed each time a predetermined length of display update interval elapses. In step S1, the parameters to be used in the abridgment processing, i.e., the specific value $\epsilon$ for the linearization processing and the unit angle $\Delta\theta$ for the orthogonalization processing, are determined in correspondence to the abridgment factor having been set by the user or having been automatically set. In step S2, the abridgment processing, i.e., the linearization processing and the orthogonalization processing, is executed as explained earlier based upon the parameter values having been set in step S1, thereby generating an abridged map.

In step S3, orientation processing is executed on the abridged map resulting from the abridgment processing in step S2. The orientation processing in this context refers to processing through which the route, viewed from the current position, is set along the direction directly upward on the screen by rotating the entire abridged map around the center thereof. It is to be noted that this orientation processing may be executed as necessary and may be omitted.

In step S4, the positions of landmarks in the abridged map having been generated in step S2 and having undergone the orientation processing in step S3 as necessary are corrected as explained earlier. In step S5, the landmarks are superimposed on the abridged map, and the resulting abridged map is displayed at the display monitor 16. Once the processing in step S5 is executed, the processing flow in FIG. 7 ends.

FIGS. 8 and 9 present display examples each corresponding to a specific abridgment factor set for the abridged map generated and displayed through the processing described above. FIG. 8 presents examples of abridged wide-area map display which contains the entire route extending from the current position 20 to a destination 26, whereas FIG. 9 presents examples of abridged detailed map display of an area around the current position 20. Each of the abridged maps shown in FIGS. 8 and 9 contains the recommended route (the roads indicated with a halftone line in the figure) extending from the current position 20 to the destination 26 and roads not on the route. Among the roads not on the recommended routes, higher rank roads such as national highways are indicated by bold lines and lower rank roads are indicated by fine lines.

FIGS. 8(*a*) and 9(*a*) each present an example of map display that may be brought up when the abridgment factor is 0, i.e., an example of the initial unabridged map display. FIGS. 8(*b*) and 9(*b*) each present an example of abridged map display that may be brought up when the abridgment factor is 1 and the unit angle $\Delta\theta$ is 45°, FIGS. 8(*c*) and 9(*c*) each present an example of abridged map display brought up when the abridgment factor is 2 and the unit angle $\Delta\theta$ is 90° and FIGS. 8(*d*) and 9(*d*) each present an example of abridged map display brought up when the abridgment factor is 3 and the unit angle $\Delta\theta$ is 180°. It is to be noted that FIGS. 8 and 9 both present display examples brought up by adjusting the value for the unit angle $\Delta\theta$ used in the orthogonalization processing alone in correspondence to the value set for the abridgment factor. Namely, the value of the other parameter, i.e., the specific value $\epsilon$ used in the linearization processing, is fixed in these examples.

In both FIGS. 8(*a*) and 9(*a*), the initial maps indicate diverse road shapes, with roads assuming various angles relative to the image plane. In FIGS. 8(*b*) and 9(*b*), the road angles are set in increments of 45° and in FIGS. 8(*c*) and 9(*c*), the road angles are set in increments of 90°. In addition, FIGS. 8(*d*) and 9(*d*) each indicate the route from the current position 21 as a straight line with the names of guidance requiring intersections provided as the route information for the route. It is to be noted that FIGS. 8(*a*), 8(*b*) and 8(*c*) and FIGS. 9(*a*), 9(*b*) and 9(*c*) each include a symbol indicating a post office designated as a landmark near a guidance-requiring intersections 23. The position of the post office in each abridged map is determined by executing the landmark position correction processing explained earlier.

In the wide-area map display examples presented in FIGS. 8(*a*) through 8(*c*), guidance-requiring intersections 21 through 25 present on the route between the current position 20 and the destination 26 are all displayed. In the abridged map shown in FIG. 8(*d*), i.e., the route information on the route, however, only a limited number of guidance-requiring intersections are displayed so as to provide an easy-to-read display of the information. Thus, only the name of the guidance requiring intersection 21 closest from the current position 20 and the name of the guidance-requiring intersection 22, which is the second closest to the current position 20, are displayed, and then the name of the destination 26 is displayed after the name of the guidance-requiring intersection 22 without displaying the names of the other guidance-requiring intersections 23 through 25. It is to be noted that the names of all the guidance-requiring intersections may be displayed instead, and if all the names cannot be contained in the screen, the route information may be provided in a scroll display.

In the detailed map display examples in FIGS. 9(*a*) through 9(*c*), the guidance-requiring intersections 21 through 23 are displayed, and their names are all displayed in the map in FIG. 9(*d*). However, as in the case of the wide-area map display examples presented in FIG. 8, only a limited number of guidance-requiring intersection names may be displayed in the map in FIG. 9(*d*) if the number of guidance-requiring intersections in the displays in FIGS. 9(*a*) through 9(*c*) is equal to or greater than a predetermined value, instead. In such a case, it is desirable to display guidance-requiring intersections closest to the current position 20 with priority, as in FIG. 8.

The following advantages are achieved in the embodiment described above.

(1) Since the abridged map with specific contents is generated and displayed in correspondence to the abridgment factor, an optimal abridged map that best suits the user preference or the particulars of a given situation can be displayed.

(2) The abridged map is generated by executing linearization processing and orthogonal addition processing on road shapes, and either the extent of linearization or the extent of the orthogonalization to be achieved through the processing is adjusted in correspondence to the abridgment factor. The extent of the linearization to be achieved through the linearization processing is altered by adjusting the specific value $\epsilon$, whereas the extent of the orthogonalization to be achieved through the orthogonalization processing is altered by adjusting the value of the unit angle $\Delta\theta$. As a result, an abridged map with specific contents can be generated in correspondence to the abridgment factor.

(3) If the abridgment factor is set to the lowest level, the initial unabridged map is displayed and thus, the right type of map is displayed when the map does not need to be abridged.

(4) If the abridgment factor is set to the highest level, only the route information along the route set on the map is displayed and thus, the right type of information is displayed even when the map is not required.

(5) The abridgment factor is automatically set to a higher level when a greater number of intersections at which the vehicle needs to make turns are present along the route. Alternatively, the abridgment factor is set automatically in correspondence to the road type designated to the route. As a result, an optimal abridged map can be brought up on display without requiring the user to set the abridgment factor.

While an explanation is given above in reference to the embodiment on an example in which the abridged map is generated by reading out the map data from a storage medium such as a DVD-ROM, the present invention is not limited to this example. For instance, the present invention may be adopted in a communication navigation system that downloads the map data from an information distribution center through wireless communication via a portable telephone or the like. In such an application, the abridged map may be generated as described above at the information distribution center, and a signal indicating the results of the abridged map generation processing may be output from the information distribution center to be delivered to the on-vehicle information terminal. Namely, such an information distribution center should comprise a device that sets the abridgment factor, a device that generates an abridged map with specific contents in correspondence to the abridgment factor and a device that outputs the abridged map to an external recipient as a signal.

Figure 10:
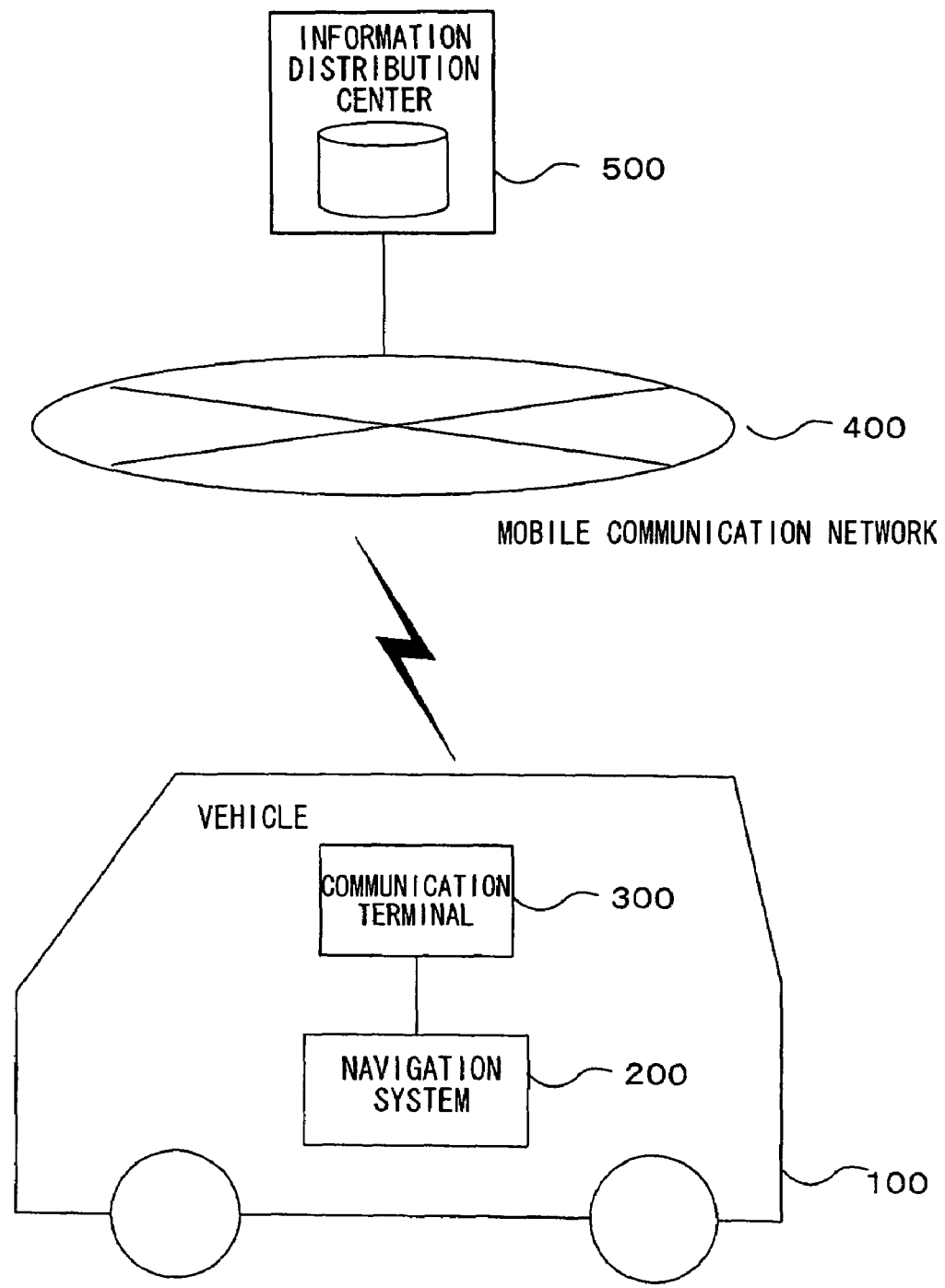
FIG. 10 shows how the present invention may be adopted in conjunction with a communication navigation system.

FIG. 10 shows the configuration of such an application. A navigation system 200 installed in a vehicle 100 is connected with a communication terminal 300. The communication terminal 300 may be, for instance, a portable telephone. The communication terminal 300 is wirelessly connected with a mobile communication network 400. An information distribution center 500 is connected with the mobile communication network 400. Namely, the navigation system 200 is connected to the information distribution center 500 via the communication terminal 300 and the mobile communication network 400. As the navigation system 200 becomes connected with the information distribution center 500, the navigation system 200 transmits a map data distribution request to the information distribution center 500. In response to the distribution request, the information distribution center 500 executes the processing explained in detail earlier and distributes the resulting map data to the navigation system 200. The navigation system 200 receives the map data transmitted from the information distribution center 500 via the mobile communication network 300 and the communication terminal 200. The present invention may be adopted effectively in such a communication navigation system, as well.

Figure 11:
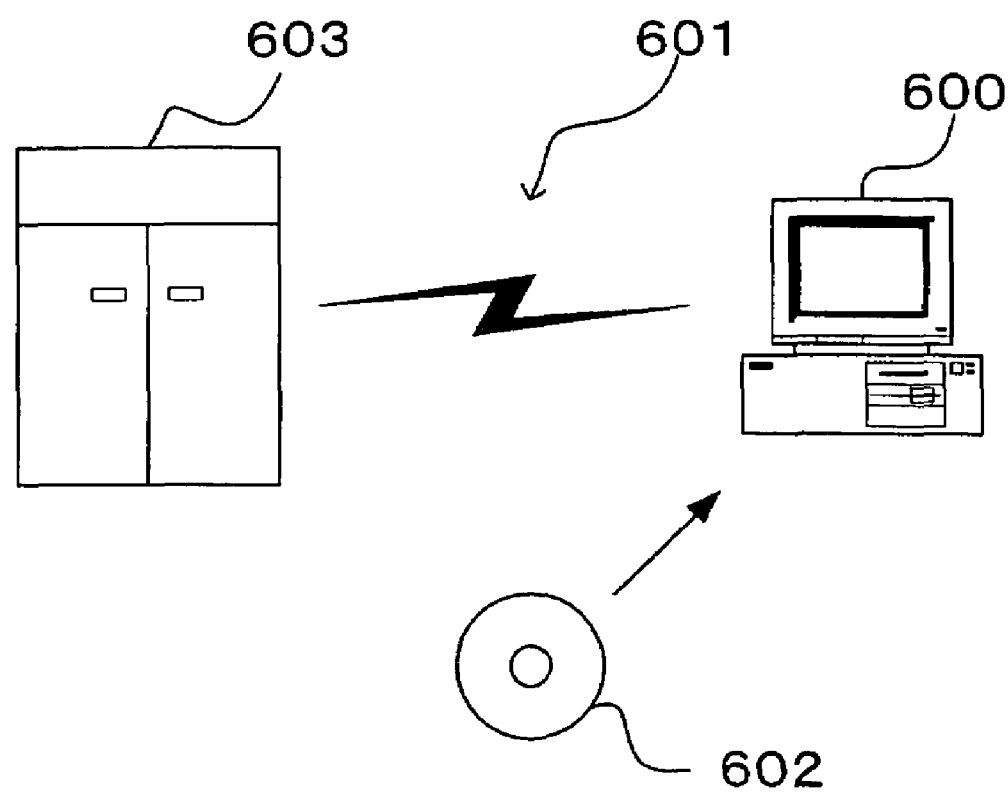
FIG. 11 shows how the present invention may be adopted in conjunction with a personal computer.

It is to be noted that when the present invention is adopted in conjunction with a personal computer or the like, the program used to implement the control described above may be provided in a recording medium such as a CD-ROM or via an electric communication network such as the Internet. FIG. 11 shows the configuration that may be adopted in such an application. A personal computer 600 obtains the program via a CD-ROM 602. In addition, the personal computer 600, which can be connected with a communication line 601, may obtain the program from a server 603. The communication line 601 may be a communication line for Internet communication, personal computer communication or the like, or it may be a dedicated communication line. The server 603 transmits the program to the personal computer 600 via the communication line 601. In other words, the program is converted to a data signal transmitted on a carrier wave and the data signal resulting from the conversion is transmitted via the communication line 601. As described above, the program may be distributed as a computer-readable computer program product adopting any of various modes including a recording medium and a carrier wave.

The present invention is not limited to the example explained in reference to the embodiment and it will be understood by those skilled in the art that various changes in form and detail may be made therein without departing from the spirit, scope and teaching of the invention.

The disclosure of the following priority application is herein incorporated by reference:
Japanese Patent Application No. 2003-326744 filed Sep. 18, 2003

The invention claimed is:

1. An on-vehicle information terminal that generates an abridged map by abridging a map based upon map data and displays the abridged map, comprising:
an abridgment factor setting unit that sets an abridgment factor indicating an extent to which the map is to be abridged;
a map abridging unit that generates the abridged map with specific contents in correspondence to the abridgment factor set by the abridgment factor setting unit; and
a display unit that displays the abridged map generated by the map abridging unit, wherein:
if the abridgment factor is set to a highest level, the map abridging unit generates an abridged map that includes a route having been set which is indicated as a straight line and names of guidance-requiring intersections at which the route makes a turn displayed on the straight line.

2. An on-vehicle information terminal according to claim 1, wherein:
the map abridging unit displays the names of guidance-requiring intersections corresponding to a predetermined number of guidance-requiring intersections closest to a current position.

3. An on-vehicle information terminal according to claim 1, wherein:
the map abridging unit generates the abridged map by executing linearization processing and orthogonalization processing for road shapes; and
the map abridging unit generates the abridged map with specific contents by adjusting at least either an extent of linearization to be achieved through the linearization processing or an extent of orthogonalization to be achieved through the orthogonalization processing in correspondence to the abridgment factor.

4. An on-vehicle information terminal according to claim 1, wherein:
if the abridgment factor is set to a lowest level, an initial unabridged map is displayed.

5. An on-vehicle information terminal according to claim 1, wherein:
the abridgment factor setting unit sets a higher abridgment factor when a greater number of intersections at which the route set on the map makes turns are present along the route.

6. An on-vehicle information terminal according to claim 1, wherein:
the abridgment factor setting unit sets the abridgment factor in correspondence to a road type assigned to the route set on the map.

7. An abridged map generation apparatus that generates an abridged map by abridging a map based upon map data, comprising:
an abridgment factor setting unit that sets an abridgment factor indicating an extent to which the map is to be abridged;
a map abridging unit that generates the abridged map with specific contents in correspondence to the abridgment factor set by the abridgment factor setting unit; and
an abridged map output unit that outputs the abridged map generated by the map abridging unit to an external recipient as a signal, wherein:
if the abridgment factor is set to a highest level, the map abridging unit generates an abridged map that includes a route having been set which is indicated as a straight line and names of guidance-requiring intersections at which the route makes a turn displayed on the straight line.

8. An abridged map display method for generating an abridged map by abridging a map based upon map data and displaying the abridged map, comprising:
setting an abridgment factor indicating an extent to which the map is to be abridged;
generating the abridged map in correspondence to the abridgment factor having been set, by indicating a route having been set as a straight line and displaying names of guidance-requiring intersections at which the route makes turns on the straight line when the abridgment factor is set to a highest level; and
displaying the abridged map having been generated.

9. An on-vehicle information terminal according to claim 2, wherein:
the map abridging unit generates the abridged map by executing linearization processing and orthogonalization processing for road shapes; and the map abridging unit generates the abridged map with specific contents by adjusting at least either an extent of linearization to be achieved through the linearization processing or an extent of orthogonalization to be achieved through the orthogonalization processing in correspondence to the abridgment factor.

10. An on-vehicle information terminal according to claim 2, wherein:

if the abridgment factor is set to a lowest level, an initial unabridged map is displayed.

11. An on-vehicle information terminal according to claim 3, wherein:

if the abridgment factor is set to a lowest level, an initial unabridged map is displayed.

12. An on-vehicle information terminal according to claim 2, wherein:

the abridgment factor setting unit sets a higher abridgment factor when a greater number of intersections at which the route set on the map makes turns are present along the route.

13. An on-vehicle information terminal according to claim 3, wherein:

the abridgment factor setting unit sets a higher abridgment factor when a greater number of intersections at which the route set on the map makes turns are present along the route.

14. An on-vehicle information terminal according to claim 4, wherein:

the abridgment factor setting unit sets a higher abridgment factor when a greater number of intersections at which the route set on the map makes turns are present along the route.

15. An on-vehicle information terminal according to claim 2, wherein:

the abridgment factor setting unit sets the abridgment factor in correspondence to a road type assigned to the route set on the map.

16. An on-vehicle information terminal according to claim 3, wherein:

the abridgment factor setting unit sets the abridgment factor in correspondence to a road type assigned to the route set on the map.

17. An on-vehicle information terminal according to claim 4, wherein:

the abridgment factor setting unit sets the abridgment factor in correspondence to a road type assigned to the route set on the map.

* * * * *